Figure 1:
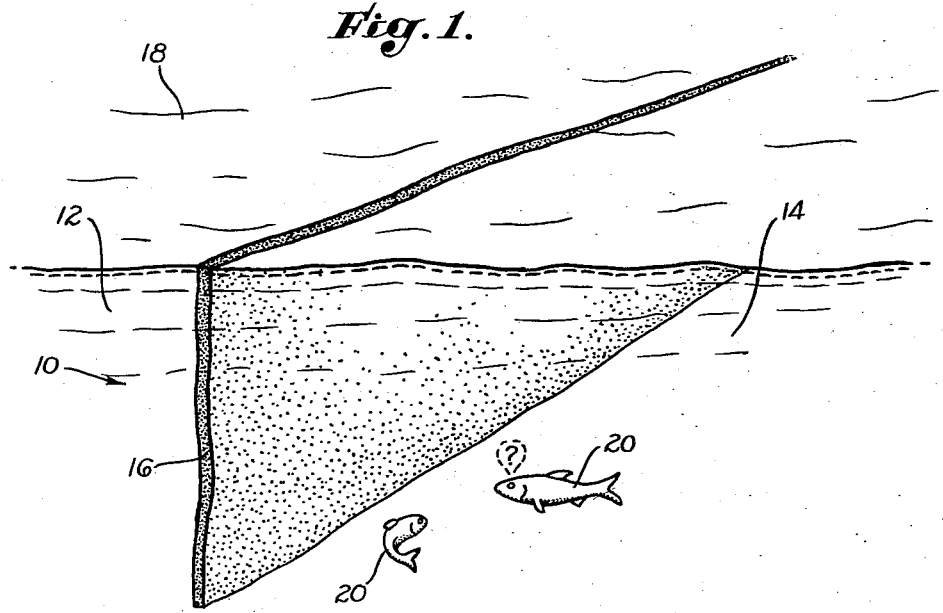

Oct. 22, 1957  A. L. ALLYN  2,810,229
METHOD OF AND MEANS FOR CONTROLLING FISH MOVEMENTS
Filed April 5, 1956

INVENTOR.
ALVIN L. ALLYN

BY HIS ATTORNEYS.
HARRIS, KIECH, FOSTER & HARRIS

United States Patent Office 2,810,229
Patented Oct. 22, 1957

2,810,229

METHOD OF AND MEANS FOR CONTROLLING FISH MOVEMENTS

Alvin L. Allyn, San Pedro, Calif., assignor to Shark Chaser Chemicals Company, San Pedro, Calif., a corporation of Nevada Application April 5, 1956, Serial No. 576,387

4 Claims. (Cl. 43—4.5)

The present invention relates in general to controlling the movements of fish and, more particularly, to preventing the movement of fish from one zone of a body of water to another through the interface of such zones, or, more accurately, through an interfacial region between such zones. In most instances, the two zones will be horizontally spaced and the interface or interfacial region therebetween will be generally vertical, but, in some instances, the two zones may be vertically spaced and the interface or interfacial region therebetween may be generally horizontal.

Generally speaking, a primary object of the invention is to prevent fish movement from one zone to another by diffusing in the water in the interface or interfacial region between such zones a material through which fish are unwilling to pass, such material, which is preferably in solution throughout the interfacial region, creating a relatively thin fish barrier which is variously referred to herein as a curtain, fence or wall. The general effect of forming a curtain of such a material in solution in the water at the interface of the two zones is to produce a condition which is foreign to the body of water and which fish therefore instinctively avoid, possibly out of fear, the desire for self-preservation, and/or similar factors, the exact factors of limited intelligence, communication, or other senses, which influence fish behavior in this respect being unknown to me at the present time.

While, as will be discussed in more detail hereinafter, the present invention contemplates fish barriers other than visual, an important object of the invention is to provide a visual barrier between two zones of a body of water by forming a curtain of dye in solution in the water throughout the interface of the two zones, the quantity of dye present and the thickness of the curtain being sufficient to provide a barrier which is at least substantially opaque so that fish can see through the barrier from one zone to the other only dimly, if at all.

I have found that fish refuse to swim through a dye curtain or wall of the foregoing character, and insofar as I have been able to determine, this is true of fish of all species and applies equally to fresh water and salt water varieties. This phenomenon was strikingly demonstrated with a generally vertical dye curtain approximately one hundred feet in length and extending from the surface to the bottom at Avalon, Santa Catalina Island, California. In this instance, the dye curtain was formed by depositing a line of crystals of a dye of the nigrosine type, which is a blue-black dye, on the surface, it being understood that dyes of other types and other colors may be utilized as discussed in more detail hereinafter. The dye crystals, being denser than the water, sank slowly and dissolved as they did so to form a dye curtain of approximately two feet in thickness which was at least substantially opaque so the fish could not see clearly from one side of the curtain to the other. This curtain remained in place for several hours before currents and wave action dispersed it sufficiently to render it ineffective, and during that interval it completely prevented the passage of fish therethrough. Under the conditions prevailing during this particular test, fish of various species indigenous to the area mentioned tended to move toward the dyed area from one side thereof. In each instance, however, the fish refused to swim through the dye curtain and turned back. Apparently confused, the fish of all species observed milled around on one side of the curtain until a large mass of fish of various species was piled up adjacent the curtain but spaced some distance therefrom. This massing or schooling of the fish occurred even though the dye curtain was, as hereinbefore indicated, only about one hundred feet in length. While some fish which approached the barrier adjacent the ends thereof did swim around the ends of the barrier, those which approached the barrier inwardly of the ends thereof massed in the foregoing manner. Subsequent tests have resulted in duplications of the foregoing phenomenon.

As suggested earlier herein, the precise reasons for fish behavior of the foregoing character are presently unknown to me, although such behavior is undoubtedly an instinctive one possibly arising from such factors as fear of the unknown, the desire for self-preservation, and/or the like. For the most part, ocean water is very clear and is substantially colorless when viewed from beneath the surface, the blue or green coloration of the surface of the ocean being a phenomenon which occurs only when the ocean is viewed through the air above the surface. Normally, such clarity of ocean water is disturbed only by surface shadows due to clouds in the air, or due to marine life, or shadows formed thereby, in the water itself. Subsurface light variations resulting from such phenomena, being natural or normal, apparently have relatively little influence on fish movements. However, the dye curtain of the present invention, which is an artificial or unnatural phenomenon, has an entirely different effect and fish simply refuse to pass through it as hereinbefore discussed. Whether the dye curtain of the invention deters the movement of fish simply because of its physical presence, or because of some other factor, such as the shadow effect which it creates, I have not been able to determine. It may be that fish avoid the dye barrier for reasons similar to those which cause them to avoid the inky clouds created by the octopus as a protective measure, whatever such reasons may be. However, these are not the sole reasons since dye curtains of colors quite different from the dye clouds produced by the octopus are also effective for the purposes of the present invention.

While on the subject of dye colors, it might be well to point out that at least some varieties of fish appear to have color responses very similar to those of humans and tend to approach certain colors more closely than others. However, whether such an apparent color responsiveness is really a color responsiveness as we know it, or is merely a responsiveness to the varying opacity or effective shadow intensity resulting from differently-colored dye curtains of the present invention, is unknown to me. In any event, the effectiveness of the present invention in controlling the movements of fish is not limited to any particular color, various colors and various dyes being suitable. The following table lists more or less typical dyes which are suitable for the purposes of the present invention and which are soluble in both fresh water and salt water, the information presented in the table being obtained from an internationally recognized publication entitled "The Colour Index," edited by F. M.

Rowe, and published in 1924 by The Society of Dyers and Colourists at Bradford, Yorkshire, England:

| Color in Water | Prototype Name (Colour Index Listing) | Colour Index No. |
| --- | --- | --- |
| Fluorescent Red | Rhodamine BXP | 749 |
| Greenish Blue | Erioglaucine A | 671 |
| Bright Green | Naphthol Green | 5 |
| Deep Purple | Induline B | 861 |
| Orange Yellow | Orange G | 27 |
| Bright Orange | Brilliant Croceine | 252 |
| Brown | Recorcine Brown | 234 |
| Bright Red | Brilliant Scarlet | 185 |
| Violet | Benzyl Violet 4B | 697 |
| Blue Black | Nigrosine WSB | 865 |
| Fluorescent Green | Uranine | 766 |

The dye chemicals listed in the foregoing table are intended as illustrative only and it will be understood that the table is not to be regarded as excluding other suitable dye chemicals not listed therein.

Also, while the present specification has thus far been devoted primarily to a dye barrier to which fish apparently react visually, and while it is an important object to provide such a barrier, as hereinbefore discussed, the invention also contemplates fish barriers of other chemicals in solution in the water at the interface of two zones to be isolated from each other, such other chemicals either being used alone, particularly if they are dyes as well, or in conjunction with dyes. For example, fish barriers may be created by dissolving such materials as copper acetate, copper sulphate, ammonium acetate, maleic acid, rotenone and hydrazine in the water in the interfacial region between two zones to be isolated from each other, such materials normally being used as shark repellents and causing positive physical distress to sharks and other species of fish when they come in contact with solutions thereof. Materials of this nature may be used alone to create fish barriers, or may be utilized in conjunction with dyes. It will be understood that barriers formed from any of the foregoing shark repellent chemicals which are not visible in themselves may not, unless used in conjunction with a dye, be as effective as the dye curtain of the invention alone in some instances, particularly with regard to fast moving fish whose momentum may carry them through the barrier before they have time to be distressed sufficiently by the chemical to be turned back. However, barriers of such materials, when visible in themselves, or when utilized in conjunction with dyes to render them visible, provide a double action in that they cause fish to react visually and to react physically if they come in contact with the barrier, due to the physical distress produced by such chemicals. Various other materials, producing effects which turn fish back for still other reasons, may also be utilized in diffusion in water to form barriers, either by themselves, or in conjunction with dyes and/or fish repellent materials. In each instance, the object is to diffuse throughout the interfacial region between two water zones to be separated a material, or combination of materials, which produces an effect or condition from which fish will turn, the different general classifications of materials discussed producing this effect or condition in different ways.

The desired material or materials may be placed in solution in the desired body of water throughout the interface or interfacial region between two zones thereof to be separated from each other in various ways. For example, the procedure referred to earlier herein may be utilized, such procedure merely involving depositing a trail or line of crystals or particles of the desired material, or combination of materials, on the surface of the water so that the crystals or particles dissolve as they sink to form a barrier, this procedure being effective for any material which is denser than the water in which it is to be dissolved, which is true of the materials hereinbefore discussed. In some instances, such as in shallow water, or where it is desired to create a barrier of relatively shallow depth in deep water, a concentrated water solution of the desired material may be deposited in a line or trail on the surface of the water along the upper edge of the barrier to be created, such solutions being capable of descending many feet before sufficient diffusion occurs to attain an equilibrium condition. With solid particles or crystals, it will be apparent that the barrier depth may be controlled effectively by suitably relating the particle size and the rate at which the material goes into solution, which rate can be varied by means of suitable additives.

A very effective method of creating fish barriers in accordance with the present invention, and one which offers close control of the depth of the barrier and the intensity of the solution of which it is formed, involves the use of pellets disclosed in the copending application of Albert L. Stallkamp, Serial No. 568,543, filed February 29, 1956. This copending application discloses numerous pellets containing dyes and/or fish repellents and having carefully controlled solubility rates and densities. Disclosed in this copending application are pellets having constant densities ranging from values less than that of the water in which they are to be dissolved so that they float, to values greater than that of the water so that they descend at selected rates. Also disclosed therein are variable density pellets which alternately rise and fall in the water as they dissolve, the latter being particularly desirable in the creation of a barrier in accordance with the present invention since they produce extremely uniform distribution of the desired material throughout the interfacial region in which the barrier is to be erected.

When pellets of the nature disclosed in the copending application mentioned are deposited on the surface of the water in a line or zone defining the upper edge of the interfacial region in which a barrier is to be created, they form generally vertical streamers of the desired material as they float on the surface, as they descend through the water, or as they rise and fall in the water, depending on the densities of the pellets and whether the densities thereof are constant or variable. Preferably, pellets having densities greater than the water in which they are dissolved, or having densities alternately greater than and less than the water, are utilized in creating fish barriers in accordance with the present invention since barriers of greater depths can be created therewith, the floating pellets mentioned being effective only for relatively shallow barriers and then only as long as the material or materials incorporated therein are denser than the water in concentrated solutions therein. The multiplicity of generally vertical streaks or streamers of dissolved material produced by such pellets in the foregoing manner creates a substantially impenetrable curtain or wall the depth of which depends on such factors as pellet density and pellet solubility rate. These generally vertical streaks or streamers, which represent relatively concentrated solutions, diffuse horizontally in a relatively short time to produce a substantially homogeneous barrier.

When utilizing a dye as the barrier creating material, the streaks or streamers of dye formed by depositing the pellets mentioned along a trail or path on the surface of the water provide the same over-all effect to horizontal fish sight, irrespective of whether this effect is one of color or shadow, as does uniform distribution of the dye throughout the barrier region. Consequently, the barrier is almost immediately effective, even before horizontal diffusion of the dye renders the barrier substantially homogeneous. Such horizontal diffusion of the dye occures irrespective of the presence of wave action and currents, so that a substantially uniform barrier is created even in the absence of agitation, although agitation does accelerate the process. However, agitation also disperses the barrier more rapidly so that it does not remain effective as long as it would in still water. However, even with agitation, the barrier of the invention, whether formed of a dye, or other materials, remains effective for a substantial period of time, e. g., several hours at least.

Another way of creating a fish barrier in accordance with the present invention is to place in and/or move through the desired body of water one or more receptacles containing, or vehicles carrying, the desired material, it being possible with this procedure to form barriers which range from generally horizontal to generally vertical and which may be formed at any desired depth. For example, generally horizontal curtains may be formed by attaching perforated canisters or fabric bags containing the desired material in solid form to weighted lines at the desired level or levels, or by attaching hose outlets leading from a source of the desired material in solution to such lines, and then producing relative movement of the water and the lines, as by depending the lines from a boat moving or drifting through the water. Still other ways of creating fish barriers in accordance with the present invention will occur to those skilled in the art and it is thought that the foregoing exemplary procedures constitute a sufficient disclosure.

Numerous uses of fish barriers created in accordance with the present invention are possible and while various uses thereof will be discussed hereinafter, it will be understood that the invention is not to be regarded as limited thereto, except insofar as may be required by the claims hereof, since it is impossible to list all of the potential uses herein and others will readily occur to those developing skill in this art.

One general use of the fish barriers of the invention is as a protective device for preventing the entry of fish into a designated zone for various reasons. For example, such barriers may be used to keep carnivorous fish, such as sharks, out of designated areas where their presence would constitute a hazard to humans, or other life. For this purpose, the barrier may be a dye curtain producing a visual repelling effect, a curtain of a material which repels because of the physical distress it produces, with or without visual repulsion, a curtain formed of a dye and physical repellent mixture, or a curtain formed of a diffusion of a material which creates some other repellent effect. Curtains of this nature may be utilized to exclude sharks from bathing beaches to protect swimmers, to exclude sharks from zones in which divers are working, to exclude sharks from harbors or the like, to exclude sharks from water zones in which landing operations are taking place, and the like. For these and any of the other purposes herein disclosed, the barriers may be of any suitable shape. That is, they may be straight or curved, they may extend all the way across a body of water from shore to shore, or they may extend only part way across a body of water, or they may be closed, e. g., circular, barriers enclosing isolated zones in the middle of a body of water.

On the general subject of excluding fish from, or retaining fish in, a particular zone, the fish barriers of the invention have other utility. For example, they may be utilized to exclude fish from the vicinities of sonar installations to minimize spurious signals. Alternatively, they may be utilized to exclude fish from contaminated water zones, or to keep different fish in a single body of water separated either temporarily, or permanently by re-establishing the barrier from time to time.

Thus, it will be seen that, considered broadly, the barriers of the present invention may be utilized to exclude fish from specified water zones, or to confine fish in specified water zones, by diffusing materials capable of creating fish repelling conditions or effects throughout the interfaces or interfacial regions between adjacent water zones. Such barriers will remain in place for surprisingly long periods of time, particularly where there is relatively little agitation due to wave or current action. Even in the vicinities of beaches, the barriers of the invention remain effective for extended periods of time, particularly if located sufficiently far off shore to minimize the effects of surf action.

Considering another category of possible uses of fish barriers of the present invention, and particularly fish barriers of the invention having the form of dye curtains which act as visual repellents, such barriers may be utilized widely in the fishing industry. For example, considering the case of fish scattered throughout a zone of the open sea and moving in one general direction, a generally vertical dye curtain may be created, in any of the ways hereinbefore discussed, at the boundary of the area in which the fish are located and in a position to intercept them. A dye curtain of this nature will act much like a drift fence does in controlling the movement of cattle on an open range. In other words, the dye curtain will stop the fish and cause them to mass or school even though there may be some continued movement in directions generally parallel to the dye curtain. The effectiveness of such a fish barrier in massing or schooling the fish may be enhanced by creating the barrier in the form of an arc so that most of the fish tend to mass near the center thereof. Causing fish to mass or school in this manner may be for the purpose of facilitating catching the fish with hooks, with nets, or with any other equipment.

As another possibility in the fishing line, a fish barricade or curtain of the invention may be created around a school of fish to prevent scattering thereof while a net is being set, or while the fish are being hooked, or the like.

Another important application of the present invention in connection with fishing resides in the creation of a generally vertical fish barrier, such as a dye curtain, before, as, or after, a purse seine is set, the barrier preferably being created concurrently with the paying out of the net from the purse seiner. By creating a fish barrier which extends below the purse seine a substantial distance, which may readily be accomplished with various pellet forms disposed in the aforementioned copending application, the effective width or depth of the purse seine may be greatly increased to prevent fish, such as tuna, for example, which have sounded within the net from swimming under the net and escaping. Thus, the effective width or depth of a purse seine may be increased from 100 to 200 feet, for example, to 500 feet or more. Consequently, the escape of fish under the net before the net is completely set and the bottom thereof closed, is eliminated, or at least greatly reduced. It will be understood that the purse seine may be located within the dye or other curtain, or inside or outside of the curtain, the distance between the seine and the curtain preferably being minimized if the curtain is outside of the net to keep fish from escaping between the net and the curtain.

The escape of fish from under the net may be further reduced by creating one or more generally horizontal barriers near the bottom of or under the net.

Of course, it will be understood that in utilizing the present invention in fishing as hereinabove discussed, the invention has a double effect in that not only does it confine fish within a particular water zone, but it also excludes sharks and other carnivorous fish from such zone to eliminate or minimize loss of catches, net damage, and the like, particularly if the curtain includes a physical shark repellent in addition to or in lieu of a dye.

On the subject of sharks and purse seining, it might be well to point out that weighted distributing lines for producing one or more generally horizontal barriers in the manner described above as the seiner drifts through the water, may be used effectively to protect the net and catch from sharks while the fish are being brailed into the hold of the seiner and the net is being hoisted aboard, sharks being particularly prone to attack the net and catch under such conditions. By creating one or more horizontal barriers through and/or under the net, with or without a vertical barrier around the net, sharks can be kept away to prevent damages to the net and loss of the catch, the diameter of the net having been reduced to a value about equal to the length of the seiner at the brailing stage so that weighted distributing lines depending from the seiner may be used very effectively to create one or more horizontal barriers.

Similar results may be attained in sports fishing by creating one or more horizontal barriers around and/or under a catch by means of weighted distributing lines depending from a moving boat. In this case, the action of the propeller of the boat assists in distributing the desired material into horizontal curtains.

Figure 2:
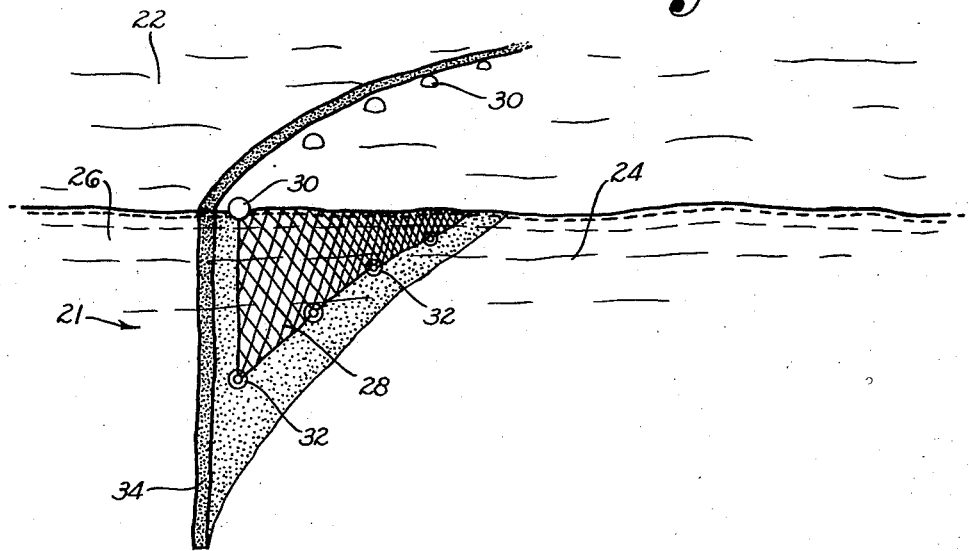

While the invention will be readily understood from the foregoing description, the accompanying drawing will clarify the description. In the drawing:

Fig. 1 is a diagrammatic, combination perspective and sectional view illustrating a fish barrier of the invention formed in accordance with the method thereof; and Fig. 2 is a diagrammatic, combination sectional and perspective view illustrating the hereinbefore discussed application of the invention to purse seining.

Referring first to Fig. 1 of the drawing, the numeral 10 designates a body of water which is separated into two horizontally spaced zones 12 and 14 by a fish barrier 16 of the invention which extends from the surface 18 of the body of water to any desired depth therebelow, depending upon such conditions as the total water depth, the depth to which the fish whose movements to be controlled will swim, and the like. In the event that the barrier 16, which occupies an interfacial region between the zones 12 and 14, is formed of a dye in solution in the water, the thickness of the barrier and the concentration of the dye therein are preferably such as to make the barrier at least substantially opaque so that, at most, the fish can see therethrough only dimly. For example, this effect can be achieved with a barrier thickness of three feet and a dye concentration corresponding to one lb. per 15,620 cubic feet of sea water, which is equivalent to one part per million, this example being for a blue-black dye of the nigrosine type in sea water under average conditions of water clarity and lighting. If the barrier 16 is formed of a material which, or the effect of which, is sensed by fish other than visually, e. g., if the barrier is formed of one of the materials hereinbefore discussed which produces physical distress only and which has substantially no visual effect, then the barrier should be somewhat thicker so that fish starting to swim through it have time to be affected thereby before passing all the way through. For this reason, a dye curtain, or a curtain formed of a nonvisual material plus a dye, is preferable. Assuming that the barrier 16 is a dye curtain, the numeral 20 designates fish approaching the barrier from one side and being turned back thereby, either through fear of the unknown factor which the visual barrier represents, or for some other reason not presently known to me.

Referring to Fig. 2 of the drawing, the number 21 designates a body of water the surface of which is designated by the numeral 22 and which is divided into an inner zone 24 and a surrounding outer zone 26 by a purse seine 28 having along its upper edge the usual floats 30 and along its lower edge the usual rings 32, the latter serving as sinkers to keep the seine 28 generally vertical and having threaded therethrough means, not shown, for closing the bottom of the seine, or purse. Also located between the zones 24 and 26 and enveloping or closely adjacent the net 28 is a barrier 34 of the invention such as a dye barrier, the barrier 34 being shown as being located just outside the net. The fish barrier 34 may be created before the net 28 is payed out, as the net is payed out, or after it is payed out, it perhaps being most convenient to pay out the net and deposit a trail of pellets, or the like, concurrently. As clearly shown in Fig. 2, the effect of the barrier 34 is to greatly increase the depth or width of the seine 28 so that many fish which normally might sound and escape from beneath the net will be confined within the boundary of the net by the barrier 34 so that they may be caught by closing the bottom of the net after returning to or near the surface 22, which is an important feature. As hereinbefore discussed, one or more generally horizontal barriers, not shown, may also be created to prevent the escape of fish from the net 28 and to protect the net and catch from sharks.

Although I have disclosed various exemplary embodiments herein for purposes of illustration, it will be understood that various changes, modifications or substitutions may be incorporated in such embodiments without departing from the spirit of the invention as defined by the claims hereinafter appearing.

I claim as my invention:

1. A fish barrier extending across a body of water and comprising a net and a substantially opaque wall of dye dissolved in the water adjacent said net.

2. A fish barrier extending across a body of water and comprising a net oriented generally vertically in the water and a substantially opaque curtain of dye dissolved in the water adjacent said net and extending below said net, whereby fish located between the lower edges of said net and said dye curtain wil not move from one side of said net to the other.

3. A method of preventing the movement of fish between two horizontally spaced zones of a body of water, including the steps of: setting a net generally vertically at the interface of said zones; and creating a curtain of dye in solution in the water adjacent the net and extending therebelow.

4. A method of purse seining, including the steps of: setting a purse seine generally vertically in the water; and diffusing a dye in the water in a generally vertical zone adjacent the purse seine and extending therebelow so as to form a dye curtain through which fish are reluctant to pass and which increases the effective depth to which the purse seine is set.

References Cited in the file of this patent

UNITED STATES PATENTS

| | | |
|---|---|---|
| 2,389,719 | Dinsley | Nov. 27, 1945 |
| 2,458,540 | Tuve et al. | Jan. 11, 1949 |